(12) United States Patent
Guo et al.

(10) Patent No.: US 12,620,795 B2
(45) Date of Patent: May 5, 2026

(54) STRAIN RELIEF CLAMP

(71) Applicant: TRIDONIC GMBH & CO KG, Dornbirn (AT)

(72) Inventors: Xiaobin Guo, Shenzhen (CN); Canbang Yang, Shenzhen (CN)

(73) Assignee: TRIDONIC GMBH & CO KG, Dornbirn (AT)

( * ) Notice: Subject to any disclaimer, the term of this patent is extended or adjusted under 35 U.S.C. 154(b) by 439 days.

(21) Appl. No.: 18/027,574

(22) PCT Filed: Sep. 24, 2020

(86) PCT No.: PCT/CN2020/117311
§ 371 (c)(1),
(2) Date: Mar. 21, 2023

(87) PCT Pub. No.: WO2022/061627
PCT Pub. Date: Mar. 31, 2022

(65) Prior Publication Data
US 2023/0411945 A1 Dec. 21, 2023

(51) Int. Cl.
H02G 15/007 (2006.01)

(52) U.S. Cl.
CPC ................................. H02G 15/007 (2013.01)

(58) Field of Classification Search
CPC .............. H02G 15/007; H01R 13/5812; H01R 13/5829; H01R 13/5825; H01R 13/5837; H01R 9/2416
See application file for complete search history.

(56) References Cited

U.S. PATENT DOCUMENTS

| | | | | |
|---|---|---|---|---|
| 4,516,822 A | * | 5/1985 | Wolfel | H01R 13/5812 439/459 |
| 5,921,805 A | | 7/1999 | Tabata et al. | |
| 7,114,987 B2 | * | 10/2006 | Nad | H01R 13/5812 439/449 |

FOREIGN PATENT DOCUMENTS

| | | |
|---|---|---|
| CN | 1173752 A | 2/1998 |
| CN | 2935203 Y | 8/2007 |
| CN | 102347557 A | 2/2012 |
| DE | 102009009496 A1 | 9/2009 |
| DE | 202014103395 U1 | 10/2015 |
| EP | 1137140 A2 | 9/2001 |
| EP | 1489712 A2 | 12/2004 |
| EP | 2413433 A1 | 2/2012 |
| FR | 2880211 B1 | 6/2006 |

(Continued)

*Primary Examiner* — Vanessa Girardi
(74) *Attorney, Agent, or Firm* — Volpe Koenig

(57) ABSTRACT
A strain relief clamp (100), which has a first body part (110) and a second body part (120) creating a passage (160) for clamping cables upon the two body parts securely attached together by using locking mechanisms (105,106). An individual locking mechanism (105) has a first plurality of teeth (115) protruded from the first body part (110), and a spring strip (130) formed with a second plurality of teeth (135). The second plurality of teeth (135) faces and engages with the first plurality of teeth (115) to lock the individual locking mechanism (105). The spring strip (130) is bendable, allowing a user to bend the spring strip (130) and subsequently cause the second plurality of teeth (135) to disengage from the first plurality of teeth (115) to release the individual locking mechanism (105). Tool-free release of the cables is achieved, offering the user convenience.

16 Claims, 6 Drawing Sheets

(56)                         References Cited

FOREIGN PATENT DOCUMENTS

| GB | 2183405 | A | 6/1987 |
|----|---------|----|--------|
| WO | 2011099863 | A1 | 8/2011 |

* cited by examiner

STRAIN RELIEF CLAMP

TECHNICAL FIELD

The present disclosure generally relates to a strain relief clamp for clamping one or more cables. In particular, the present disclosure relates to such strain relief clamp configured to enable a user to release the one or more cables from the strain relief clamp manually without a need to use a tool, thus offering user convenience.

BACKGROUND

A strain relief clamp is a mechanical device for attaching and securing an end of an electrical cable to an equipment. A major purpose of using the strain relief clamp is to provide strain relief to the electrical cable such that when the electrical cable is pulled abruptly, or is subject to a constant pulling force, the electrical cable is made more difficult to be detached from the equipment. Unintended detachment of the electrical cable from the equipment is undesirable or even dangerous. For example, if the electrical cable used for supplying power to the equipment, such as a lighting device driver, is suddenly detached from the equipment, it may result in damage to the equipment, or exposed terminals of the electrical cable may lead to safety hazard to nearby personnel. The strain relief clamp is indispensable in increasing equipment reliability and safety.

It is important to offer user convenience in using the strain relief clamp. For current existing strain relief clamp structures, such as the ones used in EP 2,413,433 and DE 102009009496, a tool is need to release a cable from a strain relief clamp. To offer user convenience, it is desirable to have a new structure of strain relief clamp having an advantage of allowing tool-free release of the cable.

Other desirable features and characteristics of the strain relief clamp as disclosed herein will become apparent from the subsequent detailed description and the appended claims, taken in conjunction with the accompanying drawings and this background of the disclosure.

SUMMARY

A first aspect of the present disclosure is to provide a strain relief clamp for clamping one or more cables with an advantage that a user is able to release the one or more cables from the strain relief clamp manually without a need to use a tool. Convenience to the user is thus provided.

The strain relief clamp comprises a first body part, a second body part and a plurality of locking mechanisms. The first and second body parts are detachably attachable together, and configured to create a passage used for clamping one or more cables upon the first body part securely attached to the second body part. Each locking mechanism is configured to releasably lock the first and second body parts together. The first and second body parts are securely attached together when respective locking mechanisms in the plurality of locking mechanisms are locked.

An individual locking mechanism comprises a first plurality of teeth and a spring strip. The first plurality of teeth is protruded from the first body part. The spring strip has a first end portion and a second end portion. The first end portion is attached to the second body part. The spring strip is formed with a second plurality of teeth. The second plurality of teeth is detachably engageable with the first plurality of teeth. The first and second pluralities of teeth are respectively located in the first body part and the spring strip such that the second plurality of teeth faces and engages the first plurality of teeth so as to lock the individual locking mechanism. Advantageously, the spring strip is bendable such that the second end portion is movable by a user. It allows the user to move the second end portion to bend the spring strip and subsequently cause the second plurality of teeth to disengage from the first plurality of teeth so as to release the individual locking mechanism. Thereby, it enables the first and second body parts originally securely attached together to be separated manually without a need to use a tool during releasing the one or more cables from the strain relief clamp.

Preferably, the individual locking mechanism further comprises one or more hooks mounted to the second body part for temporarily fixing the spring strip. It avoids the spring strip from rebounding back to re-engage the first and second pluralities of teeth after disengaged by the user and after the user withdraws his or her hand from the second end portion.

Preferably, the second body part is formed with a finger insert area adjacent to the spring strip, and, in particular, adjacent to the second end portion. It allows the user to conveniently insert his or her fingers into the finger insert area to bend the spring strip.

In one embodiment, the first plurality of teeth and the spring strip are located in the first body part and the second body part, respectively, such that the spring strip is pulled outwardly from the second body part to disengage the second plurality of teeth from the first plurality of teeth in releasing the individual locking mechanism. In another embodiment, the first plurality of teeth and the spring strip are located in the first body part and the second body part, respectively, such that the spring strip is pushed inwardly toward the second body part to disengage the second plurality of teeth from the first plurality of teeth in releasing the individual locking mechanism.

Preferably, the spring strip is resilient. Resilience of the spring strip allows the second plurality of teeth originally disengaged from the first plurality of teeth to press towards and subsequently engage with the first plurality of teeth to automatically lock the individual locking mechanism. It thereby enables the first and second body parts originally detached from each other to be securely attached by the user manually without a need to use the tool during fixing the one or more cables in the strain relief clamp.

In certain embodiments, the first body part further comprises a first edge, and the second body part further comprises a second edge. The first and second edges are configured to clamp the one or more cables when the passage is created. The first or second edge may be grooved or corrugated for enhancing friction with the one or more cables.

Preferably, the plurality of locking mechanisms consists of a first locking mechanism and a second locking mechanism. It is also preferable that the first and second locking mechanisms are respectively positioned on two opposite lateral sides of the clamp.

In certain embodiments, the first and second body parts are made of plastic.

A second aspect of the present disclosure is to provide a light emitting diode (LED) converter.

In a first realization of the LED converter, the LED converter comprises a plurality of electrical terminals for connecting to a plurality of external cables, and a strain relief accessory for clamping the plurality of external cables. The strain relief accessory is realized by any one of the embodiments of the strain relief clamp disclosed herein.

The LED converter further comprises a housing installed with the plurality of electrical terminals. In one option, the strain relief accessory may be detachably attachable to the housing. In another option, the first body part of the strain relief accessory is integrated to the housing.

In a second realization of the LED converter, the LED converter comprises a plurality of terminal groups and a plurality of strain relief accessories. An individual terminal group comprises a plurality of electrical terminals for connecting to a plurality of external cables. Each strain relief accessory is used for clamping a respective plurality of external cables. An individual strain relief accessory is realized by any one of the embodiments of the strain relief clamp disclosed herein.

The LED converter further comprises a housing installed with the plurality of terminal groups. In one option, the individual strain relief accessory is detachably attachable to the housing. In another option, the first body part of the individual strain relief accessory is integrated to the housing.

Other aspects of the present disclosure are disclosed as illustrated by the embodiments hereinafter.

BRIEF DESCRIPTION OF THE DRAWINGS

The appended drawings, where like reference numerals refer to identical or functionally similar elements, contain figures of certain embodiments to further illustrate and clarify various aspects, advantages and features of an output load identification method and an apparatus incorporating such method as disclosed herein. It will be appreciated that these drawings and graphs depict only certain embodiments of the invention and are not intended to limit its scope. The diameter adapter accessory as disclosed herein will be described and explained with additional specificity and detail through the use of the accompanying drawings in which.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the present disclosure or the following detailed description.

Provided herein is a strain relief clamp for clamping one or more cables with an advantage that a user is able to release the one or more cables from the strain relief clamp manually without a need to use a tool, such as a screwdriver. Such tool-free release of the one or more cables offers convenience to the user.

Figure 1:
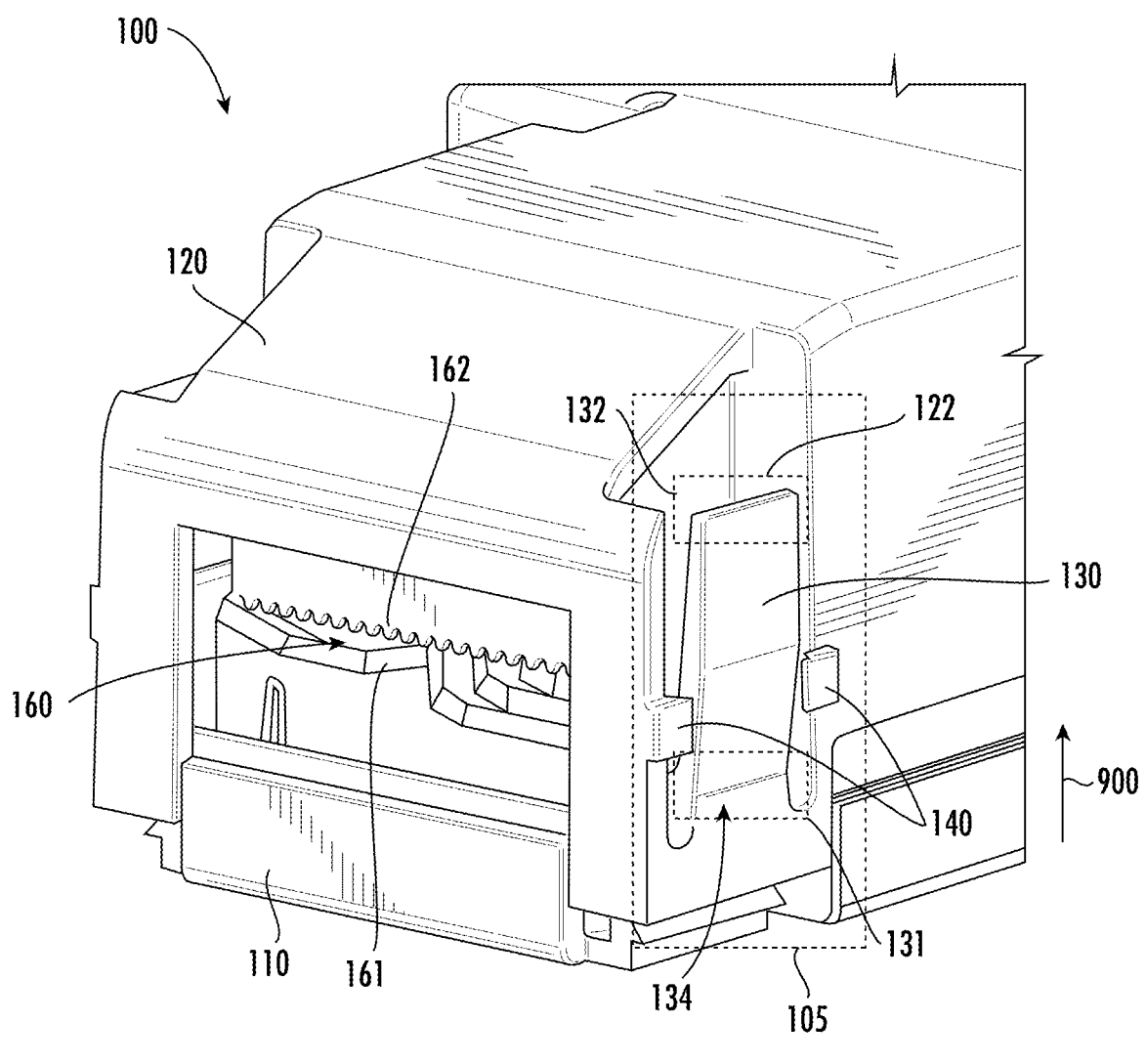
FIG. 1 depicts a strain relief clamp in accordance with a first exemplary embodiment of the present disclosure.
Figure 2:
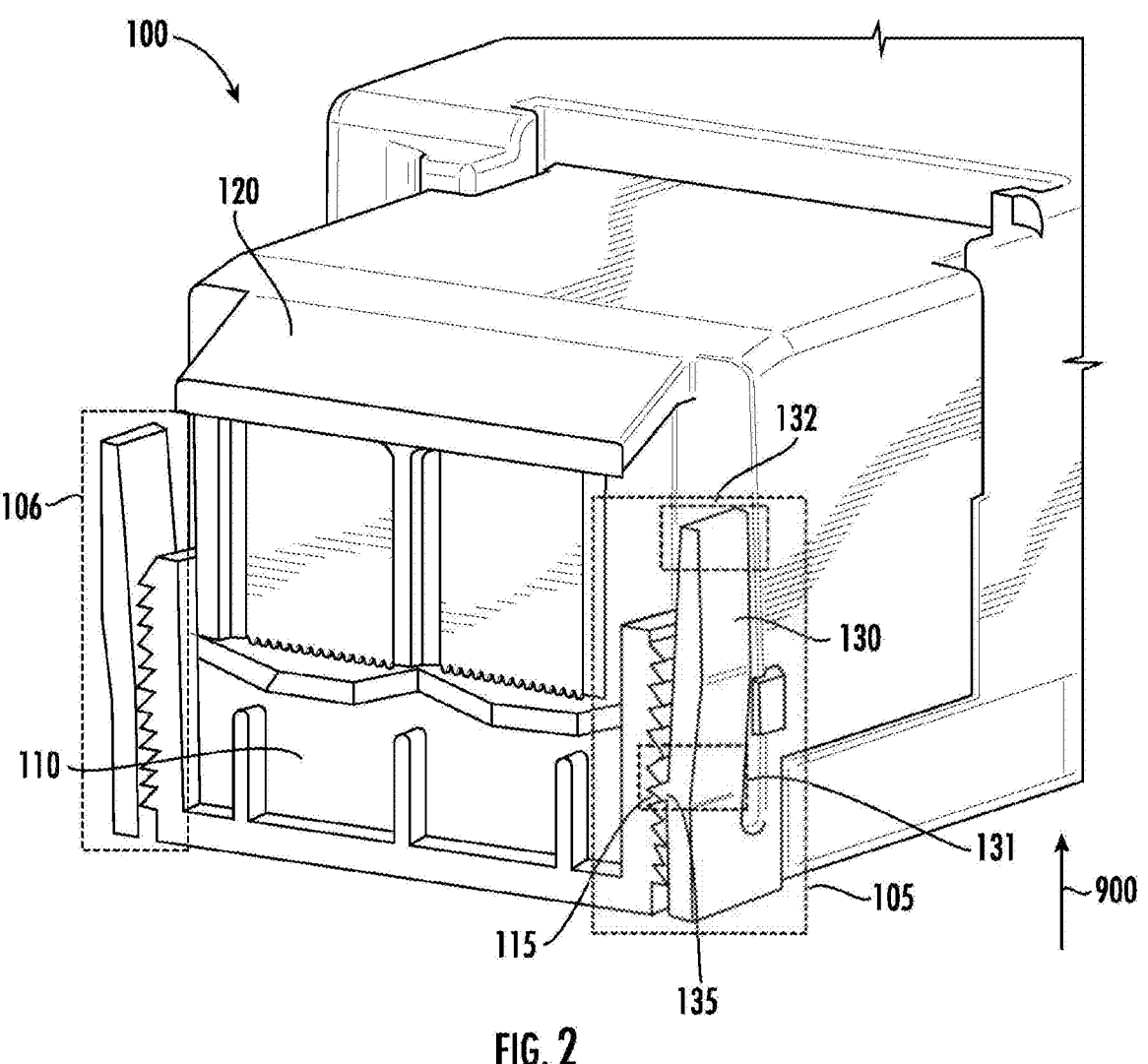
FIG. 2 depicts a bisected view of the strain relief clamp of FIG. 1.

FIG. 1 depicts a strain relief clamp 100 in accordance with a first exemplary embodiment of the present disclosure. A bisected view of the strain relief clamp 100 is depicted in FIG. 2. A reference vertical direction 900 is defined as an upward pointing direction according to the gravitational force. Herein in the specification and appended claims, positional and directional words such as "above," "below," "higher," "upper," "lower," "top," "bottom" and "horizontal" are interpreted with reference to the reference vertical direction 900.

The strain relief clamp 100 comprises a first body part 110 and a second body part 120. The first and second body parts 110, 120 are detachably attachable together. To provide a function of clamping or gripping one or more cables, the first and second body parts 110, 120 are configured to create a passage 160 used for clamping the one or more cables when the first body part 110 is securely attached to the second body part 120. The number of cable(s) allowable to be gripped inside the passage 160 is a design objective of the strain relief clamp 100, and is determinable by those skilled in the art according to a horizontal length of the passage 160 and diameter(s) of the cable(s) to be gripped.

To enable the first and second body parts 110, 120 to be securely attached, the strain relief clamp 100 further comprises a plurality of locking mechanisms 105, 106 each configured to releasably lock the first and second body parts 110, 120 together. The first and second body parts 110, 120 are securely attached together when respective locking mechanisms in the plurality of locking mechanisms 105, 106 are locked. All the respective locking mechanisms are similar. Without loss of generality, consider the locking mechanism 105 as a representative one for illustrating the plurality of locking mechanisms 105, 106.

The locking mechanism 105 comprises a first plurality of teeth 115 and a spring strip 130. The first plurality of teeth 115 is protruded from the first body part 110. The spring strip 130 is installed on the second body part 120, and has a first end portion 131 and a second end portion 132. In particular, the spring strip 130 is formed with a second plurality of teeth 135 detachably engageable with the first plurality of teeth 115. The first and second pluralities of teeth 115, 135 are respectively located in the first body part 110 and the spring strip 130 such that the second plurality of teeth 135 faces and engages the first plurality of teeth 115 so as to lock the locking mechanism 105. Advantageously, the spring strip 130 is bendable such that the second end portion 132 is movable by a user. As a result, the user is manageable to move the second end portion 132 to bend the spring strip 130 and subsequently cause the second plurality of teeth 135 to disengage from the first plurality of teeth 115 so as to release the locking mechanism 150. Thereby, the first and second body parts 110, 120 originally securely attached together can be separated manually without a need to use a tool during releasing the one or more cables from the strain relief clamp 100. Tool-free release of the one or more cables is thus achieved.

The spring strip 130 may be made bendable by using a flexible material, such as an elastomer or a resin, to form the spring strip 130. The bending of the spring strip 130 may also be guided by forming a trench 134 on the first end portion 131. The spring strip 130 is then guided to pivotally rotate about the trench 134 when the user pushes or pulls the second end portion 132.

Apart from being bendable, preferably the spring strip 130 is also resilient. Resilience of the spring strip 130 allows the second plurality of teeth 135 originally disengaged from the first plurality of teeth 115 to press towards and subsequently engage with the first plurality of teeth 115 to automatically lock the locking mechanism 105. Thereby, it enables the first and second body parts 110, 120 originally detached from each other to be securely attached by the user manually without a need to use the tool during fixing the one or more cables in the strain relief clamp 100.

The locking mechanism 150 is unlocked by hauling out the spring strip 130 outwardly from the second body part 120 to disengage the second plurality of teeth 135 from the first plurality of teeth 115. When the user stops pulling the spring strip 130, it is possible that spring strip 130 rebounds back due to its resilient property, causing the first and second pluralities of teeth 115, 135 to re-engage together. Preferably, the locking mechanism 105 further comprises one or more hooks 140 mounted to the second body part 120 for temporarily fixing the spring strip 130. It has an advantage of avoiding the spring strip 130 from rebounding back to re-engage the first and second pluralities of teeth 115, 135 after disengaged by the user and after the user withdraws his or her hand from the second end portion 132. Furthermore, it has another advantage of avoiding the spring strip 130 to accidentally bend away from the second body part 120 to cause disengagement of the second plurality of teeth 135 from the first plurality of teeth 115 in an absence of the user's action of moving the second end portion 132. The accidental bending may be caused by, for example, shocking to the one or more cables in the strain relief clamp 100.

Figures 3A, 3B, 3C, 3D:
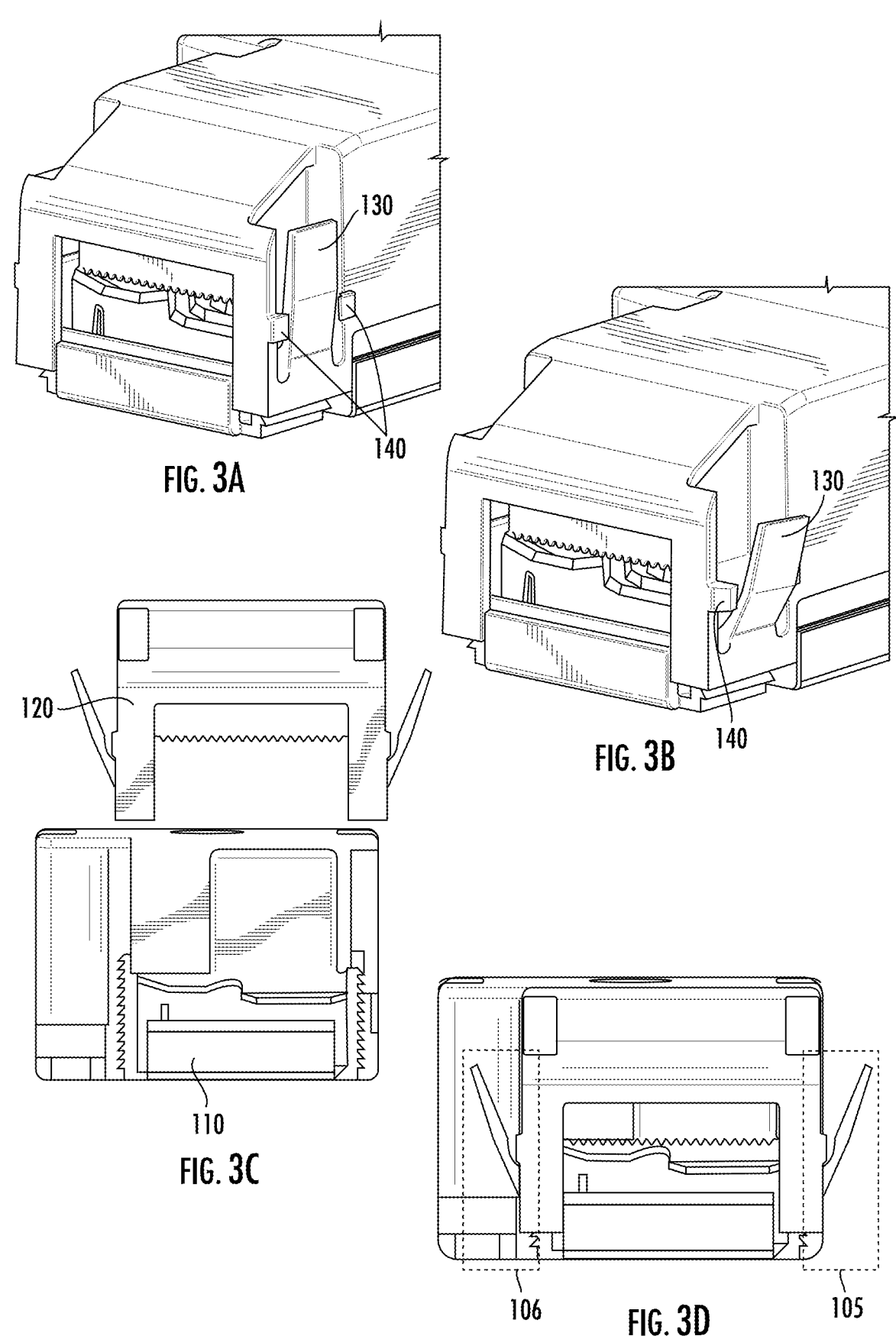
FIGS. 3A-3D illustrate main steps of releasing one or more cables form the strain relief clamp.

FIGS. 3A-3D illustrate main steps of detaching the second body part 120 from the first body part 110 for releasing the one or more cables from the strain relief clamp 100. For illustration, the strain relief clamp 100 as depicted in FIGS. 1-3 has two locking mechanisms, i.e. a first locking mechanism 105 and a second locking mechanism 106. The first and second body parts 110, 120 are originally securely attached together, as shown in FIG. 3A. The spring strip 130 of the first locking mechanism 105 is then hauled out and blocked from returning backing by the one or more hooks 140 to thereby unlock the first locking mechanism 105, as indicated in FIG. 3B. As shown in FIG. 3C, similar actions are taken for the second locking mechanism 106, making the corresponding spring strip of the second locking mechanism 106 hauled out so that the second locking mechanism 106 is unlocked. Since all the locking mechanisms 105, 106 are unlocked, finally, it is shown in FIG. 3D that the first and second body parts 110, 120 are separated, releasing the one or more cables from the strain relief clamp 100.

To offer convenience to the user in hauling out the spring strip 130, preferably the second body part 120 is formed with a finger insert area 122 adjacent to the spring strip 130, and, in particular, adjacent to the second end portion 132. It allows the user to conveniently insert his or her fingers into the finger insert area 122 to actuate the second end portion 132 so as to bend the spring strip 130.

Figure 4:
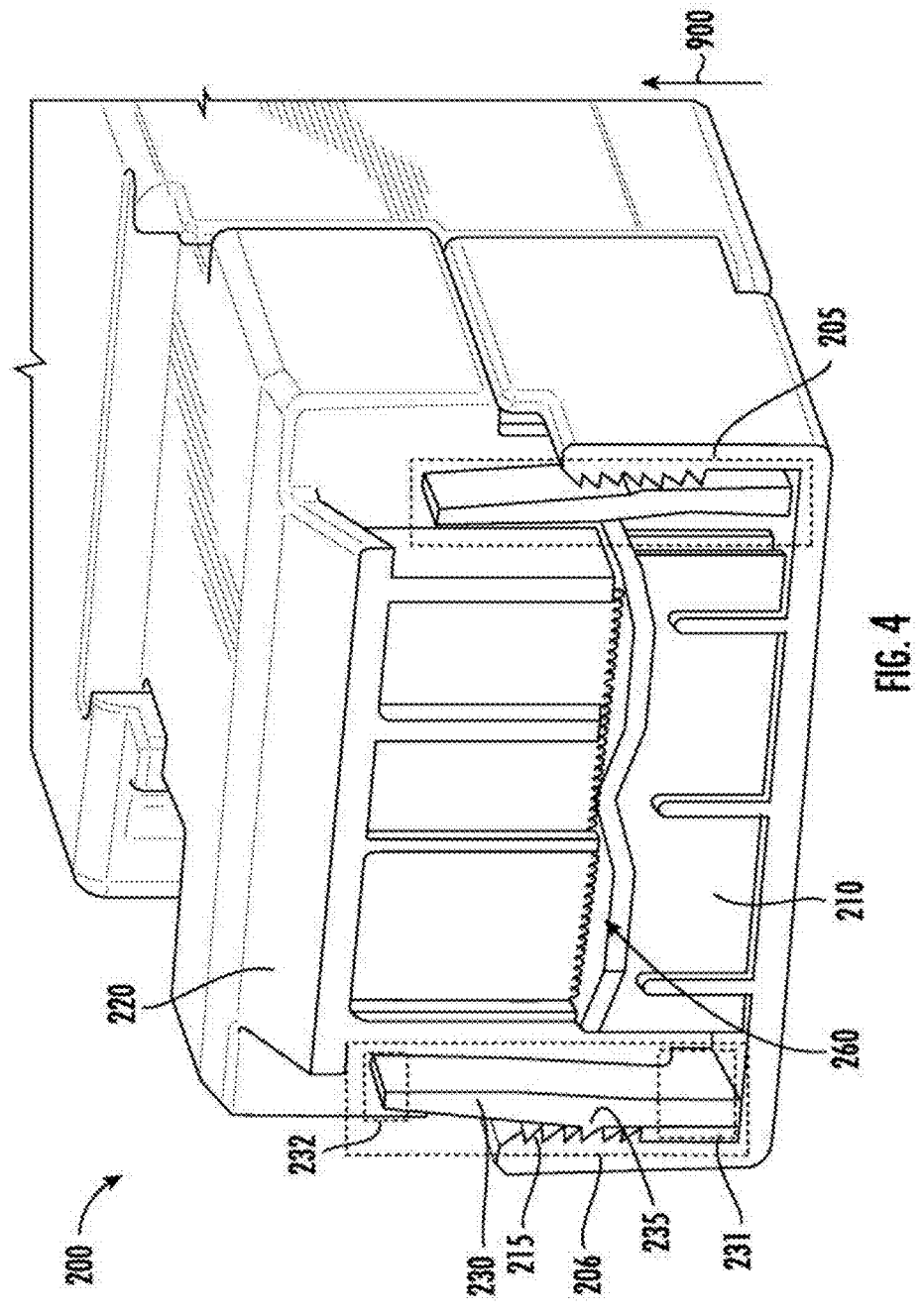
FIG. 4 depicts a bisected view of a strain relief claim in accordance with a second exemplary embodiment of the present disclosure.

Referring to FIG. 2, in the strain relief clamp 100, the first plurality of teeth 115 and the spring strip 130 are located in the first body part 110 and the second body part 120, respectively, in a manner such that the spring strip 130 is pulled outwardly from the second body part 120 to disengage the second plurality of teeth 135 from the first plurality of teeth 115 in releasing the locking mechanism 105. Alternatively, it is possible to redesign the strain relief clamp 100 for enabling the user to push the spring strip 130 inwardly to release the locking mechanism 105. The design is shown in FIG. 4, which depicts a bisected view of a strain relief clamp 200 in accordance with a second exemplary embodiment of the present disclosure.

The strain relief clamp 200 comprises a first body part 210, a second body part 220 and a plurality of locking mechanisms. The plurality of locking mechanisms is illustrated in FIG. 4 with a first locking mechanism 205 and a second locking mechanism 206. The first and second body parts 210, 220, being detachably attachable together, are configured to create a passage 260 used for clamping one or more cables upon the first body part 210 securely attached to the second body part 220. The first and second body parts 210, 220 are securely attached together when respective locking mechanisms in the plurality of locking mechanisms 205, 206 are locked. All the respective locking mechanisms are similar. Take the second locking mechanism 206 as a representative one for illustrating the plurality of locking mechanisms. The second locking mechanism 206 comprises a first plurality of teeth 215 and a spring strip 230. The first plurality of teeth 215 is protruded from the first body part 210. The spring strip 230 has a first end portion 231 and a second end portion 232. The spring strip 230 is formed with a second plurality of teeth 235 detachably engageable with the first plurality of teeth 215. The first plurality of teeth 215 and the second plurality of teeth 235 are respectively located in the first body part 210 and the spring strip 230 such that the second plurality of teeth 235 faces and engages the first plurality of teeth 215 so as to lock the second locking mechanism 206. The spring strip 230 is bendable such that the second end portion 232 is movable by a user. The user moves the second end portion 232 to bend the spring strip 230 and subsequently cause the second plurality of teeth 235 to disengage from the first plurality of teeth 215 so as to release the second locking mechanism 206. Thereby, the first and second body parts 210, 220 originally securely attached together can be separated manually without a need to use a tool during releasing the one or more cables from the strain relief clamp 200.

The present strain relief clamp 200 is different from the strain relief clamp 100 disclosed above in that the first plurality of teeth 215 and the spring strip 230 are reversely oriented in comparison to the corresponding first plurality of teeth 115 and the corresponding spring strip 130. In particular, the first plurality of teeth 215 and the spring strip 230 are respectively located in the first body part 210 and the second body part 220 such that the spring strip 230 is pushed inwardly toward the second body part 230 to disengage the second plurality of teeth 235 from the first plurality of teeth 215 in releasing the second locking mechanism 206.

Note that the first and second locking mechanisms 205, 206 are respectively located at two opposite sides of the strain relief clamp 200. The strain relief clamp 200 may be advantageously sized such that the first and second locking mechanisms 205, 206 are simultaneously touchable by a thumb and an index finger of the user. The user can easily press the first and second locking mechanisms 205, 206 inwardly by one hand and then the strain relief clamp 200 is unlocked and released, releasing the one or more cables therein from the strain relief clamp 200. It provides convenience to the user. It also shortens the time for the user to release the one or more cables, promoting production efficiency of the user.

Apart from being bendable, preferably the spring strip 230 is also resilient. Resilience of the spring strip 230 allows the second plurality of teeth 235 originally disengaged from the first plurality of teeth 215 to press towards and subsequently engage with the first plurality of teeth 215 to automatically lock the second locking mechanism 206. Thereby, it enables the first and second body parts 210, 220 originally detached from each other to be securely attached by the user manually without a need to use the tool during fixing the one or more cables in the strain relief clamp 200.

Other implementation details of the disclosed clamp are elaborated as follows. The implementation details are applicable to both of the strain relief clamps 100, 200 unless otherwise stated. The implementation details are elaborated with reference to the strain relief clamp 100. Those skilled in the art will appreciate that the elaborated details can easily be adapted to the other strain relief clamp 200.

In certain embodiments, the first body part 110 further comprises a first edge 161, and the second body part 120 further comprises a second edge 162. The first and second edges 161, 162 are configured to clamp the one or more cables when the passage 160 is created. The first edge 161 or the second edge 162 may be grooved or corrugated for enhancing friction with the one or more cables.

FIGS. 1 and 2 depict a preferable setting that two locking mechanisms, namely, the first and second locking mechanisms 105, 106, are installed in the strain relief clamp 100. In particular, the first and second locking mechanisms 105, 106 are respectively located on two opposite lateral sides of the strain relief clamp 100 for securely fixing the first and second body parts 110, 120 together. Using only two locking mechanisms in the strain relief clamp 100 is preferable in that the first and second body parts 110, 120 can be securely engaged while the material cost of forming the plurality of locking mechanisms in the strain relief clamp 100 can be kept low. However, the present disclosure is not limited only to this preferable setting; any number of locking mechanisms greater than one may be installed in the strain relief clamp 100 as deemed appropriate by those skilled in the art.

For manufacturing cost reduction, the first and second body parts 110, 120 may be made of plastic.

Figure 5:
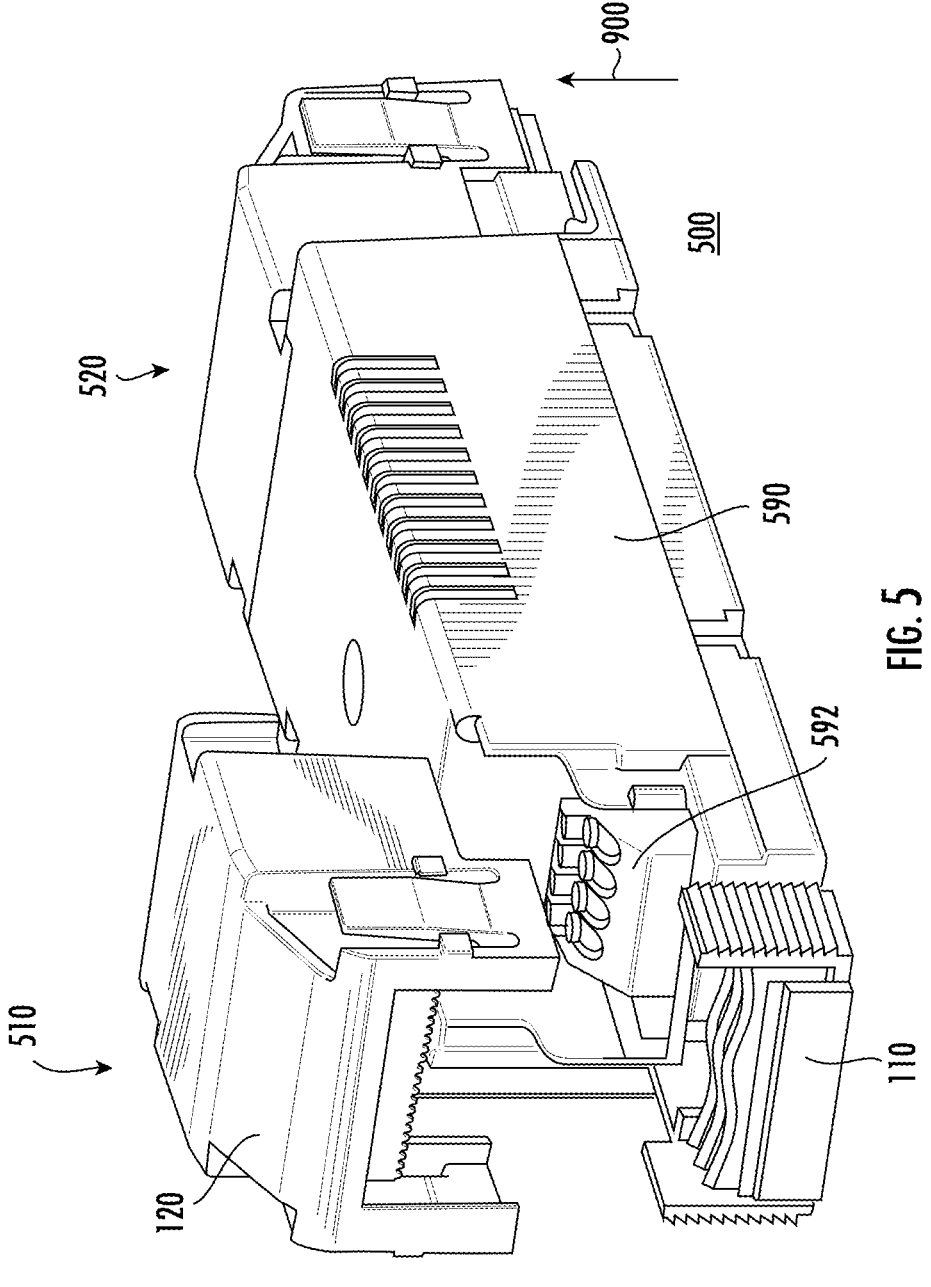
FIG. 5 depicts a LED converter installed with strain relief accessories each for gripping a group of one or more cables, where an individual strain relief accessory is realized by the strain relief clamp of FIG. 1.

The strain relief clamp 100 may be advantageously used as an accessory to an electrical device, such as a LED converter, for gripping one or more cables or cords connecting to the electrical device. For illustration, FIG. 5 depicts a LED converter 500 for providing electrical power to drive LEDs. The LED converter 500 is formed with a plurality of electrical terminals 592 for connecting to a plurality of external cables. In addition, the LED converter 500 comprises a strain relief accessory 510 for clamping the plurality of external cables. The strain relief accessory 510 is realized by one of the embodiments of the strain relief clamp 100 as disclosed above.

Note the LED converter 500 has a housing 590, and the housing 590 is installed with the plurality of electrical terminals 592. In one implementation option, the first body part 110 of the strain relief accessory 510 is integrated to the housing 590. The housing 590 may be integrally formed with the first body part 110. Alternatively, the first body part 110 and the housing 590 may be installed with a key and a receptacle, respectively, such that the first body part 110 and the housing 590 are integrated together by inserting the key into the receptacle. The second body part 120 thereof, being attachable to the first body part 110, is manufactured as a standalone object. In another implementation option, the strain relief accessory 510 is detachably attachable to the housing 590. For example, the first body part 110 and the housing 590 are installed with a key and a receptacle, respectively, and the housing 590 is further installed with a switch configured to user-controllably release the key from the receptacle.

Figure 6:
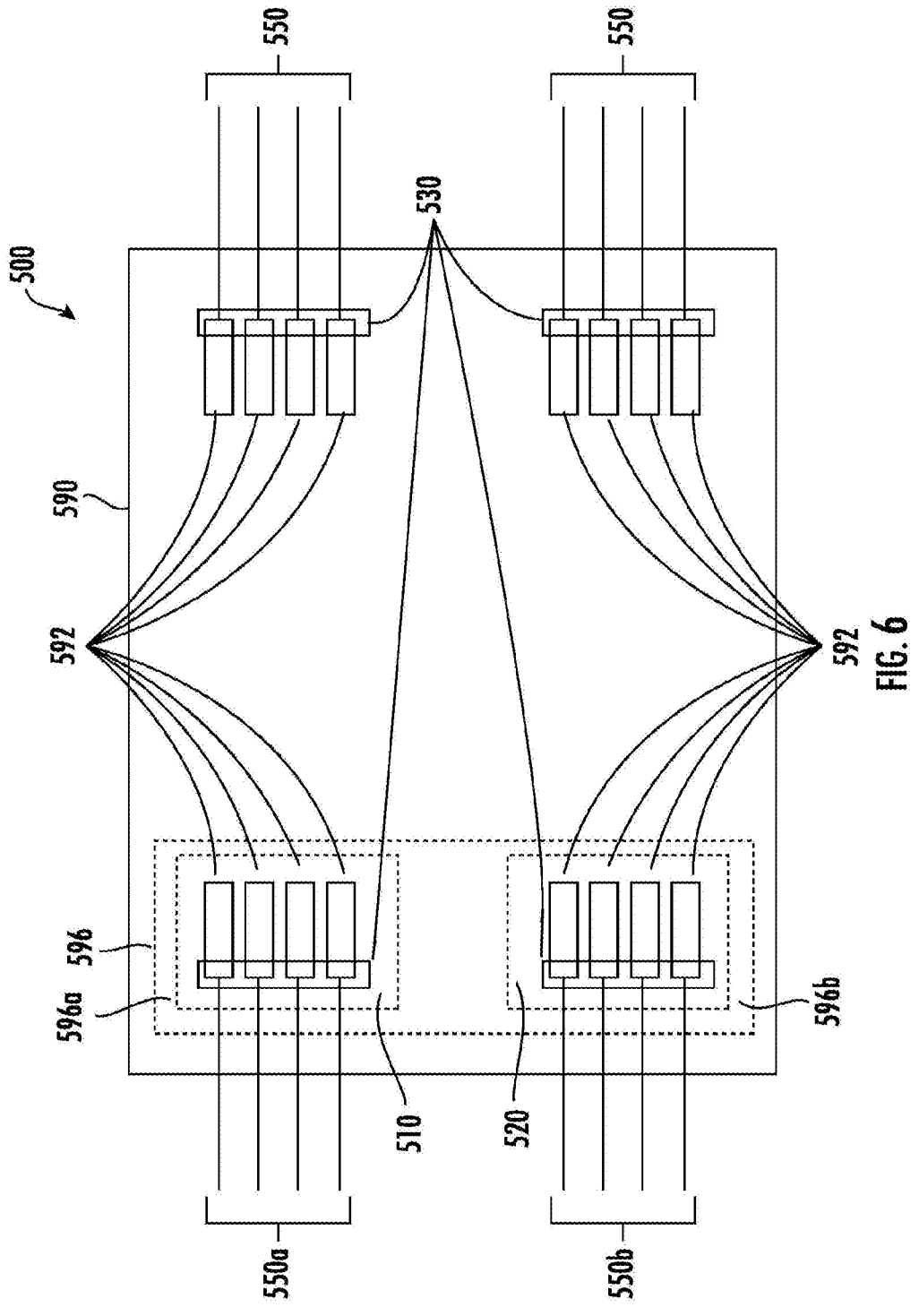
FIG. 6 depicts a schematic diagram of an LED converter.

Apart from the strain relief accessory 510, the LED converter 500 may be installed with an additional relief accessory 520 for gripping other groups of electrical cables. As schematically shown in FIG. 6, in certain embodiments, the LED converter 500 comprises a plurality of terminal groups 596 and a plurality of strain relief accessories 530. The plurality of terminal groups 596 comprises individual terminal groups (e.g. 596a, 596b). An individual terminal group (e.g. 596a) comprises a plurality of electrical terminals (e.g. 592) for connecting to a plurality of external cables 550. An individual strain relief accessory (e.g., 510 or 520) is used for clamping a respective plurality of external cables (e.g., 550a or 550b). At least two of the individual strain relief accessories (510 and/or 520) form the plurality of strain relief accessories 530. FIG. 6 shows a schematic representation of an embodiment where the plurality of strain relief accessories 530 comprises a mix of individual strain relief accessories 510 and 520 connected to respective pluralities of external cables 550a and 550b. The individual strain relief accessory (e.g., 510 or 520) is realized by one of the embodiments of the strain relief clamp 100 as disclosed above. The housing 590 is installed with the plurality of terminal groups 596. The first body part of the individual strain relief accessory may be integrated to the housing 590. Alternatively, the individual strain relief accessory may be detachably attachable to the housing 590.

In the present disclosure, the use of the terms "a" and "an" and "the" and "at least one" and similar referents in the context of describing disclosed systems, apparatuses, devices, methods and processes (especially in the context of the accompanied claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e. meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A strain relief clamp comprising:

first and second body parts detachably attachable together, the first and second body parts being configured to create a passage used for clamping one or more cables upon the first body part securely attached to the second body part; and a plurality of locking mechanisms each configured to releasably lock the first and second body parts together, the first and second body parts being securely attached together when respective locking mechanisms in the plurality of locking mechanisms are locked, an individual locking mechanism comprising:

a first plurality of teeth protruded from the first body part;

a spring strip having first and second end portions, the first end portion being attached to the second body part, the spring strip being formed with a second plurality of teeth detachably engageable with the first plurality of teeth, the first and second pluralities of teeth being respectively located in the first body part and the spring strip such that the second plurality of teeth faces and engages the first plurality of teeth so as to lock the individual locking mechanism, wherein the spring strip is bendable such that the second end portion is movable by a user, allowing the user to move the second end portion to bend the spring strip and subsequently cause the second plurality of teeth to disengage from the first plurality of teeth so as to release the individual locking mechanism, thereby enabling the first and second body parts originally securely attached together to be separated manually without using a tool during releasing the one or more cables from the strain relief clamp; and one or more hooks mounted to the second body part for temporarily fixing the spring strip so as to prevent the spring strip from rebounding back to re-engage the first and second pluralities of teeth after being disengaged by the user and after the releases the second end portion.

2. The strain relief clamp of claim 1, wherein the second body part comprises a finger insert area adjacent to the spring strip, allowing the user to conveniently insert at least one finger into the finger insert area to bend the spring strip.

3. The strain relief clamp of claim 1, wherein the first plurality of teeth and the spring strip are located in the first body part and the second body part, respectively, such that the spring strip is pulled outwardly from the second body part to disengage the second plurality of teeth from the first plurality of teeth in releasing the individual locking mechanism.

4. The strain relief clamp of claim 1, wherein the first plurality of teeth and the spring strip are located in the first body part and the second body part, respectively, such that the spring strip is pushed inwardly toward the second body part to disengage the second plurality of teeth from the first plurality of teeth in releasing the individual locking mechanism.

5. The strain relief clamp of claim 1, wherein the spring strip is resilient, resilience of the spring strip allowing the second plurality of teeth originally disengaged from the first plurality of teeth to press towards and subsequently engage with the first plurality of teeth to automatically lock the individual locking mechanism, thereby enabling the first and second body parts originally detached from each other to be securely attached by the user manually without using a tool during fixing the one or more cables in the strain relief clamp.

6. The strain relief clamp of claim 1, wherein the first and second body parts are made of plastic.

7. The strain relief clamp of claim 1, wherein the first body part further comprises a first edge, and the second body part further comprises a second edge, the first and second edges being configured to clamp the one or more cables when the passage is created.

8. The strain relief clamp of claim 7, wherein the first or second edge is grooved or corrugated for enhancing friction with the one or more cables.

9. The strain relief clamp of claim 1, wherein the plurality of locking mechanisms consists of a first locking mechanism and a second locking mechanism.

10. The strain relief clamp of claim 9, wherein the first and second locking mechanisms are respectively positioned on two opposite lateral sides of the clamp.

11. A light emitting diode (LED) converter comprising:

a plurality of electrical terminals for connecting to a plurality of external cables; and a strain relief accessory for clamping the plurality of external cables, the strain relief accessory being the strain relief clamp of claim 1.

12. The LED converter of claim 11 further comprising:

a housing installed with the plurality of electrical terminals, wherein the strain relief accessory is detachably attachable to the housing.

13. The LED converter of claim 11 further comprising:

a housing installed with the plurality of electrical terminals, wherein the first body part of the strain relief accessory is integrated to the housing.

14. A light emitting diode (LED) converter comprising:

a plurality of terminal groups, an individual terminal group comprising a plurality of electrical terminals for connecting to a plurality of external cables; and a plurality of strain relief accessories each for clamping a respective plurality of external cables, an individual strain relief accessory being the strain relief clamp of claim 1.

15. The LED converter of claim 14 further comprising:

a housing installed with the plurality of terminal groups, wherein the individual strain relief accessory is detachably attachable to the housing.

16. The LED converter of claim 14 further comprising:

a housing installed with the plurality of terminal groups, wherein the first body part of the individual strain relief accessory is integrated to the housing.

* * * * *